United States Patent

[11] 3,624,438

[72] Inventor Alfred Hoyler
Stuttgart, Germany
[21] Appl. No. 111,033
[22] Filed Jan. 29, 1971
[45] Patented Nov. 30, 1971
[73] Assignee Robert Bosch GmbH
Stuttgart, Germany
[32] Priority Feb. 5, 1970
[33] Germany
[31] P 20 05 139.2

[54] AIR-COOLED EDDY CURRENT BRAKE
14 Claims, 4 Drawing Figs.

[52] U.S. Cl. ................................................. 310/93,
310/53, 310/94
[51] Int. Cl. ............................................... H02k 49/04
[50] Field of Search .................................. 310/92, 93,
94, 96, 53

[56] References Cited
UNITED STATES PATENTS
2,440,551 4/1945 Martin ........................... 310/93

FOREIGN PATENTS
1,174,034 11/1958 France ........................ 310/93

*Primary Examiner*—D. X. Sliney
*Attorney*—Michael S. Striker

ABSTRACT: An eddy current brake wherein the rotor is braked and heated in response to energization of a coil in the stator. The rotor has a chamber which can receive cool atmospheric air by way of inlets machined into the rotor and sealable from the chamber by a valve which is carried by the stator. The rotor is further provided with blades which draw air into the chamber and expel such air into predetermined paths wherein the air exchanges heat with the stator and rotor when the valve is open. The opening of valve is controlled by electromagnets, thermostats or cylinder and piston units which cause the valve to open in response to energization of the coil and insure that the valve remains open for a predetermined or variable interval of time following deenergization of the coil to thus guarantee further cooling of the stator and rotor upon termination of a braking action.

INVENTOR.
ALFRED HOYLER

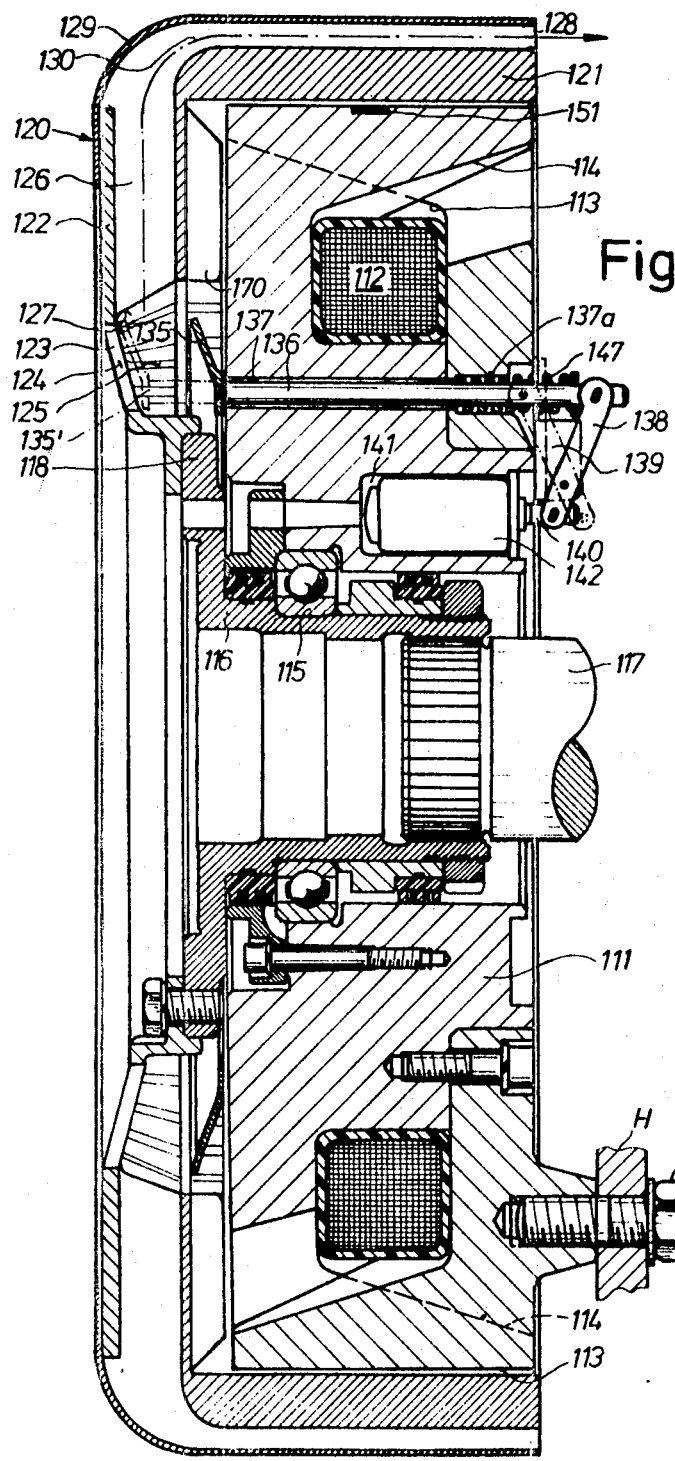

3,624,438

AIR-COOLED EDDY CURRENT BRAKE

CROSS-REFERENCE TO RELATED APPLICATION

Certain features of the eddy current brake which is disclosed in this application are claimed in my copending application Ser. No. 107,364, filed Jan. 18, 1971, entitled "Eddy Current Brake."

BACKGROUND OF THE INVENTION

The present invention relates to improvements in eddy current brakes, especially to improvements in eddy current brakes which can be used in automotive vehicles.

An eddy current brake comprises a stator and a rotor connected with one or more parts which must be braked from time to time. The stator normally comprises one or more coils which are energizable at the will of the operator to induce in the rotor eddy currents with attendant application of a braking force which is accompanied by the generation of heat. Therefore, eddy current brakes are normally provided with cooling means which cause a coolant to exchange heat with the stator and/or rotor and to thereby cool such parts during the application of a braking force.

French Pat. No. 1,174,034 discloses an eddy current brake wherein an inlet for admission of a fluid coolant is controlled by a valve which opens in response to energization of an electromagnet. The electromagnet is energizable by the operator. When the brake is used for an extended period of time, the rotor is likely to be heated to an elevated temperature in spite of cooling. The electromagnet is deenergized in response to termination of the application of a braking force; therefore, positive cooling of the rotor by means of a circulating cooling medium is terminated as soon as the braking action is completed. Additional cooling takes place by radiation rather than by exchange of heat between the rotor and a stream of circulating coolant so that a complete cooling to a desired temperature takes up a relatively long interval of time.

The aforementioned French patent further discloses modified cooling means wherein the valve which admits a stream of coolant is controlled by a bimetallic element. When the brake is heated, the bimetallic element undergoes deformation which results in opening of the valve. The valve closes in response to cooling of the bimetallic element. A drawback of such cooling means is that the cooling action normally begins with a substantial delay following the application of a braking force so that the component parts of the brake are heated to an elevated temperature before the valve is free to admit coolant which is thereupon circulated to exchange heat with the stator and/or rotor.

SUMMARY OF THE INVENTION

An object of the invention is to provide an eddy current brake with novel and improved cooling means which can insure satisfactory cooling of component parts of the brake substantially independently of the frequency and length of intervals during which the brake is in use.

Another object of the invention is to provide an eddy current brake with novel and improved control means for regulating the cooling action, particularly the duration and termination of cooling action.

A further object of the invention is to provide an eddy current brake wherein the cooling action begins in automatic response to generation of a braking action.

An additional object of the invention is to provide an eddy current brake with novel means for actuating one or more valves which admit a coolant for circulation along and exchange of heat with the stator and/or rotor of the brake when a cooling action is necessary or desirable.

Still another object of the invention is to provide a novel electric circuit for the means which produces eddy currents and for the means which regulates the cooling action in an eddy current brake.

The improved eddy current brake is particularly suited for use in automotive vehicles and comprises a rotary braking member coupled to the part or parts which require braking, a preferably stationary second braking member which is coaxial with the rotary member, coil means provided in or on one of the braking members and being energizable to induce in the other member eddy currents with attendant application of a braking force to the rotary braking member and resulting heating of the braking members, cooling means comprising coolant circulating means provided on the rotary braking member to circulate air or another suitable coolant along at least one of the braking members and valve means which is normally closed and is openable to admit a fluid coolant into the range of the circulating means on the rotary braking member, actuating means which is operable to open the valve means and is preferably mounted in or on the second braking member, and control means for the coil means and for the actuating means. The control means comprises starting means movable between an operative position in which the coil means is energized and the actuating means is operated to maintain the valve means in an open position so that the circulating means circulates a coolant while the rotary braking member is subjected to the action of a braking force, and an inoperative position in which the coil means is deenergized to terminate the braking action. In accordance with a feature of the invention, the control means further comprises time delay means for terminating the operation of actuating means to thus effect a closing of the valve means with a predetermined or variable delay following deenergization of the coil means. The time delay means can employ one or more time lag relays serving to automatically terminate the operation of actuating means and to thus close the valve means after elapse of a preselected interval of time following deenergization of the coil means, or temperature-responsive detector means which renders the actuating means inoperative in response to cooling of one or both braking members to a predetermined temperature.

The novel features which are considered as characteristic of the invention are set forth in particular in the appended claims. The improved eddy current brake itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is an axial sectional view of a third eddy current brake wherein the actuating means for the valve comprises electromagnets which must be deenergized in order to permit movement of the valve to its open position.

DESCRIPTION OF THE PREFERRED EMBODIMENTS

Figure 1:
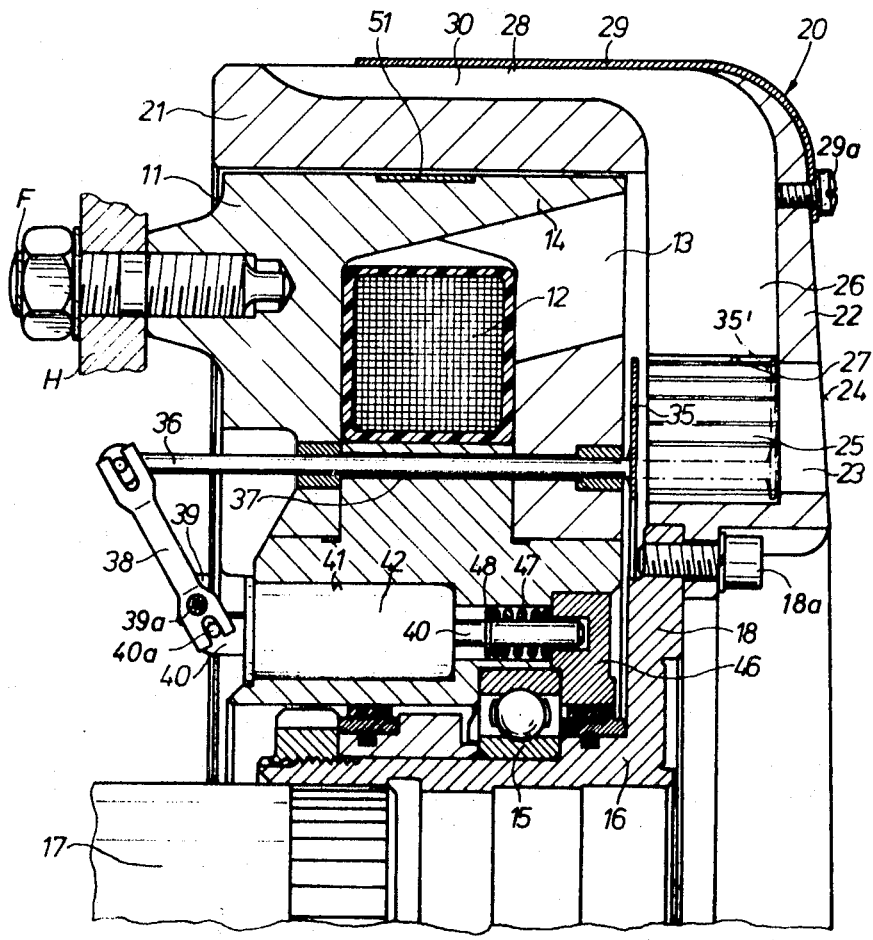
FIG. 1 is a fragmentary axial sectional view of an eddy current brake wherein the actuating means for the valve of the cooling means utilizes electromagnets which must be energized in order to open the valve.

Referring first to FIG. 1, there is shown a portion of an eddy current brake which can be used in an automotive vehicle. The brake comprises a stationary annular braking member or stator 11 and a rotary braking member 20 or rotor which is coaxial with the stator 11. The latter can be secured to the housing H of a differential or a transmission by one or more bolts F or analogous fasteners. A coil 12 which is mounted in the stator 11 is surrounded by pole shoes 13, 14. The pole shoes have interengaging claws which are outwardly adjacent to the coil 12, as considered in the radial direction of the stator 11, and the outer sides of the claws form parts of a cylindrical stator surface. An antifriction bearing 15 which is mounted in and is coaxial with the stator 11 surrounds a sleeve or hub 16 which is rotatable therein and is secured to a stub shaft 17. The shaft 17 constitutes that component part of a transmission or differential which is to be braked by the rotor 20 in response to energization of the coil 12. The hub 16 has a ring-shaped flange 18 which is bolted (as at 18a) or otherwise secured to the ring-shaped end wall 22 of the rotor 20. The latter further comprises a cylindrical portion 21 which surrounds, with small clearance, the claws of the pole shoes 13 and 14. When the coil 12 is energized, it produces a magnetic field which extends into the cylindrical portion 21 and produces in the rotor 20 eddy currents with attendant braking of the rotor and stub shaft 17. The energy of eddy currents is converted into heat which is to be dissipated or led away in accordance with a feature of the present invention.

The cooling means for the stator 11 and/or rotor 20 comprises a normally closed valve 35 and one or more sets of coolant circulating blades or vanes 27 provided on and sharing the movements of the rotor 20. The end wall 22 of the rotor 20 is provided with several equidistant coolant-admitting inlets 23 whose centers are located on a circle having a diameter which slightly exceeds the outer diameter of the flange 18 on the hub 16. The coolant is atmospheric air which can flow through the inlets 23 to enter an internal annular chamber 25 of the end wall 22 when the valve 35 is held in its open position. The inlets 23 are separated from each other by partitions or spokes 24 forming part of the end wall 22. The chamber 25 communicates with several radially outwardly extending passages or channels 26 which are machined into the end wall 22 and are separated from each other by the aforementioned blades or vanes 27. The aerodynamic design of the blades 27 is such that they draw cool atmospheric air into the chamber 25 by way of the inlets 23 when the valve 35 is held in its open position and that the blades also compel the thus admitted air to flow from the chamber 25, through the channels 26 and into axially parallel flutes 30 provided in the peripheral surface of the cylindrical portion 21 and separated from each other by elongated ribs 28. The left-hand ends of the flutes 30 extend beyond a cupped shroud 29 consisting of sheet metal or the like which is secured to the end wall 22 by screws 29a and surrounds portions of the ribs 28. The shroud 29 seals the major portions of neighboring flutes 30 from each other.

In the embodiment of FIG. 1, the valve 35 is a flat ring which is movable axially of the rotor 20 and is supported by the stator 11. The actuating means for moving the valve 35 between open and closed positions in which the valve respectively permits and prevents entry of cool atmospheric air into the chamber 25 comprises several (e.g., three) electromagnets 42 which are mounted in axially parallel recesses or sockets 41 machined into the central portion of the stator 11 radially inwardly of the coil 12. The area of the right-hand end face of the valve 35 is selected in such a way that it can overlie all of the inlets 23 when the electromagnets 42 cause or permit the valve 35 to assume its right-hand end position 35' in which the inlets 23 are sealed from the chamber 25.

The actuating means for the valve 35 further comprises three motion transmitting rods 36 which are reciprocable in axially parallel bores or holes 37 of the stator 11 and have right-hand end portions secured to the valve 35. The left-hand end portions of the rods 36 extend beyond the left-hand end face of the stator 11 and are articulately connected to the longer arms of two-armed levers 38 which are fulcrumed, as at 39a, on brackets or blocks 39 provided on the left-hand end face of the stator. The shorter arms of the levers 38 are bifurcated and straddle pins 40a provided on the axially reciprocable armatures 40 of the respective electromagnets 42. When the condition of energization of the electromagnets 42 is changed by a novel control system, namely, when the electromagnets 42 are deenergized, the armatures 40 are caused to move in a direction to the left, as viewed in FIG. 1, whereby the levers 38 are pivoted to move the rods 36 in a direction to the right and to move the valve 35 to its closed position 35' in which the inlets 23 are sealed from the chamber 25 in the end wall 22. Each armature 40 carries a retainer 48 which is biased by a helical spring 47 reacting against a ring 46 in the stator 11. The ring 46 serves to hold the races of the antifriction bearing 15 against axial movement and is provided with blind bores to guide the right-hand ends of the armatures 40. When the springs 47 are free to expand, the armatures 40 cause the levers 38 and the rods 36 to move the valve 35 to the closed position 35'. When the electromagnets 42 are energized, the armatures 40 assume the positions shown in FIG. 1 and the valve 35 automatically assumes the open position which is shown by solid lines so that the orbiting blades 27 can draw air into the chamber 25 and cause streams of air to flow in the channels 26 and flutes 30 to escape from such flutes at the left-hand end of the shroud 29. The blades 27 further cause a portion of air which enters the chamber 25 to flow between the claws of the pole shoes 13, 14 so as to cool the stator 11 including the coil 12.

Figure 2:
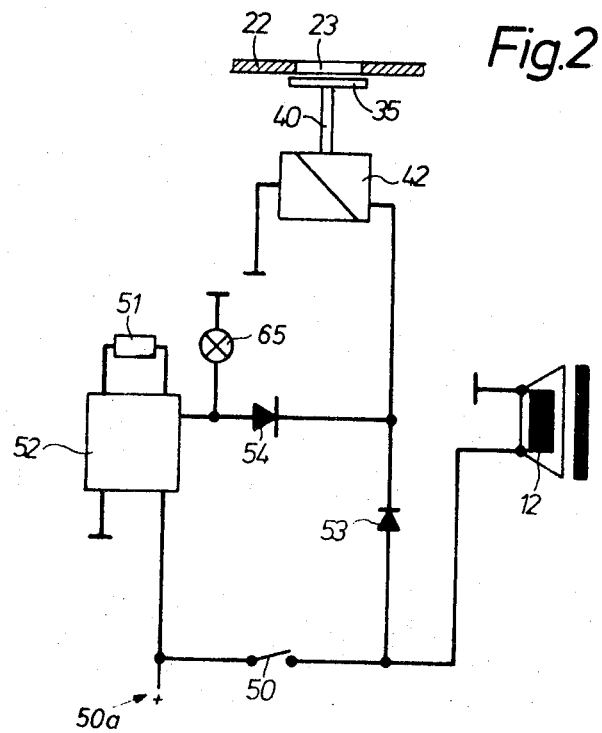
FIG. 2 is a diagram of the control system for the coil means and the actuating means of the brake shown in FIG. 1.

The control system for the coil 12 and for the electromagnets 42 is illustrated in FIG. 2. This control system includes starting means here shown as a normally open switch 50 which is closed by the operator of the vehicle when the eddy current brake is to produce a braking action, i.e., to brake the shaft 17. The windings of the electromagnets 42 (only one shown in FIG. 2) are connected in parallel with the coil 12 of the stator 11 so that the coil is energized simultaneously with energization of the electromagnets 42. Consequently, the actuating means (36, 38, 40, 42, 47, 48) maintain the valve 35 in the open position while the coil 12 is energized so that the blades 27 can cause atmospheric air to circulate while the braking members 11, 20 are being heated in response to generation of eddy currents in the rotor 20. The positive pole of an energy source 50a (e.g., a battery) is connected with the corresponding terminals of the coil 12 and of the windings of electromagnets 42 in response to closing of the starting switch 50. The coil 12 remains energized as long as the switch 50 is maintained in closed position, and the windings of the electromagnets 42 are invariably energized at least as long as the coil 12 remains energized.

In accordance with a feature of the invention, the control system for the coil 12 and for the electromagnets 42 of the actuating means for the valve 35 further comprises time delay means which causes a deenergization of electromagnets 42 with at least some delay following a deenergization of the coil 12. This insures that the valve 35 remains in open position for a certain interval of tim after the application of braking force to the shaft 17 is terminated and that the blades 27 can continue to circulate cool air along the brake members 20, 11 for a period of time which suffices to insure that the temperature of the braking members is reduced below a predetermined temperature. The time delay means of the control system shown in FIG. 2 comprises a detector 51 which is mounted on one of of the braking members 11, 20 (as shown in FIG. 1, the detector 51 is mounted on and measures the temperature of a pole shoe 14 of the stator 11) and serves to produce a signal which is indicative of a predetermined temperature of the respective braking member. The time delay means further includes a device 52 which is responsive to the signal from the detector 51 and terminates the operation of actuating means for the valve member 35 by opening the circuits of windings of the electromagnets 42 with a certain delay following deenergization of the coil 12. The detector 51 is an NTC-resistor and the device 52 is a signal amplifier which is connected with a conductor between the starting switch 50 and one terminal of each electromagnet winding by way of a diode 54. A second diode 53 is connected in the aforementioned conductor between the electromagnets 42 and the starting switch 50. The resistance of the resistor 51 varies as a function of changes in temperature of the corresponding pole shoe 14. A resistance which corresponds to a certain temperature of such pole shoe constitutes the signal which causes the amplifier 52 to open the circuits of windings of the electromagnets 42. The diode 54 prevents the output current of the amplifier 52 from reaching the coil 12, and the diode 53 prevents the current which flows to the electromagnets 42 and coil 12 in response to closing of the starting switch 50 from reaching and influencing the amplifier 52.

In accordance with a further feature of the invention, the control system includes a lamp 65 which is preferably mounted on the dashboard of the automotive vehicle and lights up to produce a readily detectable signal as long as the valve member 35 is held in its open position 35', i.e., as long as the brake is being cooled by air which is circulated by the blades 27. The lamp 65 is connected to the output of the amplifier 52 and can indicate to the operator that the cooling unit is in use as well as that the braking members 11, 20 are heated to an elevated temperature.

The lamp 65 enables the driver of the vehicle to check the temperature of the braking members. If the coil 12 must remain energized for a relatively long interval of time (e.g., while the vehicle is used on a mountain road and is in the process of traveling along an elongated downwardly sloping stretch of the road), the lamp 65 can indicate to the driver that the temperature of the stator 11 stays above a certain value for an interval of time which is long enough to warrant a temporary stoppage of the vehicle in order to allow for complete cooling of the brake. Satisfactory cooling of the brake after an extended period of use contributes to longer useful life of its parts. The lamp 65 can be designed to light up only when the rotor and/or the stator of the brake is overheated; this enables the driver to avoid unnecessary stops in order to interrupt a prolonged use of the brake when the cooling action is sufficient in spite of the fact that the coil 12 is maintained in energized condition for a relatively long interval of time.

It was found that the improved control system for the actuating means which moves the valve 35 between its open and closed positions insures satisfactory cooling of the brake even if the intervals between successive applications of the braking force are relatively short. The braking action is more satisfactory if the circuit of the coil 12 is completed when the temperature of the members 11, 20 does not exceed a relatively low-value.

Figure 3:
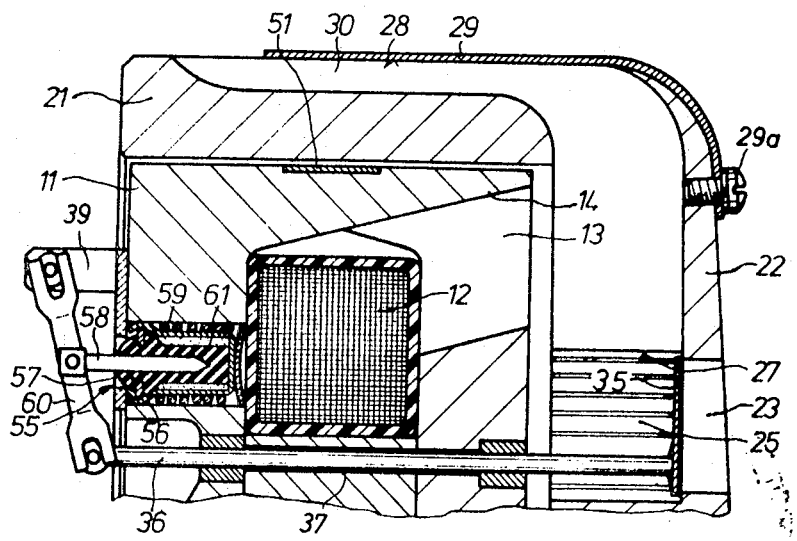
FIG. 3 is a fragmentary axial sectional view of a second eddy current brake wherein the actuating means for the valve comprises one or more heat-responsive actuating devices.

Referring to FIG. 3, the actuating means for the valve 35 may comprise one or more (for example, three) heat-responsive thermostatic devices 55 which replace the electromagnets 42 of FIG. 1. The device 55 which is shown in FIG. 3 comprises a container 56 which is resistant to deformation and contains an insert 61 consisting of material which preferably undergoes very rapid expansion in response to heating. The material of the heat-expansible element 61 may be of the type which melts in response to heating to a relatively low-temperature. A cupped diaphragm 57 extends into the container 56 and serves to separate the element 61 from a piston or plunger 58 which is attached to the median portion of a lever 60 pivotably mounted on a bracket 39 of the stator 11 and having a free end coupled to the adjacent end of a reciprocable motion transmitting rod 36 which is attached to the valve 35. The element 61 is surrounded by a heating element 59 here shown as an electric resistance wire which is convoluted around the container 56 and can be connected to an energy source to rapidly heat the element 61 whereby the latter expands and partially expels the piston 58 from the container 56 to thereby pivot the lever 60 in a clockwise direction, as viewed in FIG. 3. The rod 36 then moves the valve 35 from the illustrated closed position to an open position in which the valve 35 permits inflow of cool air into the chamber 25 of the end wall 22. The heating wire 59 is connected in parallel with the coil 12 so that it starts to heat the element 61 in response to energization of the coil 12 (i.e., as soon as the starting switch 50, not shown in FIG. 3, is closed). The time delay means of the control system in the eddy current brake of FIG. 3 includes that portion of the stator 11 which surrounds the heating wire 59 and the container 56. If the circuit of the wire 59 is opened in response to opening of the starting switch (i.e., in response to deenergization of the coil 12), the stator 11 continues to heat the element 61 by way of the container 56 so that the element 61 remains in molten condition for an interval of the time which suffices to insure proper cooling of the braking members 11 and 20. The diaphragm 57 tends to reassume the position shown in FIG. 3 and to thus cause the piston 58, lever 60 and rod 36 to return the valve 35 to its closed position. Such movement of the valve 35 is permitted by the element 61 in response to cooling of the stator 11 to a predetermined temperature. However, it is equally within the purview of the invention to utilize in the brake of FIG. 3 a time delay means which is identical with the time delay means 51, 52 of FIG. 2 (see the detector 51 of FIG. 3). The amplifier 52 then opens the circuit of the heating wire 59 with a delay which is determined by the resistor 51 and the element 61 then preferably consists of a material which contracts in immediate response to opening of the circuit for the wire 59.

As stated before, the thermostatic device 55 is preferably designed in such a way that it is capable of abruptly opening the valve 35 in response to a relatively small rise in temperature. Thus, the material of the element 61 is preferably such that this element expels the piston 58 from the container 56 as soon as the wire 61 is connected with an energy source. The reference numerals not specifically mentioned but shown in FIG. 3 denote parts corresponding to the similarly referenced parts of the brake shown in FIG. 1.

The brake of FIG. 1 can further be modified by employing actuating means of the type shown in FIG. 4. All such parts of this brake which are identical with or clearly analogous to the corresponding parts of the brake shown in FIG. 1 are denoted by similar reference characters plus 100. The inlets 123 of the rotor 120 are provided in a conical portion of the end wall 122; therefore, the valve 135 is of slightly conical shape. The end wall 122 is provided with a second set of vanes or blades 170 which cause some air to flow from the chamber 125 toward and between the claws of the pole shoes 113, 114 when the valve 135 is held in the open position which is indicated by solid lines. The actuating means for the valve 135 comprises one or more (for example, three) electromagnets 142 whose armatures 140 move in a direction to the right, as viewed in FIG. 4, and thereby cause the levers 138 and rods 136 to move the valve 135 to the closed position 135' (shown by phantom lines) when the electromagnets are energized. Helical springs 147 are installed in enlarged portions 137a of the bores 137 and react against the stator 111 to bias the rods 136 in a direction to the right, as viewed in FIG. 4, and to maintain the valve 135 in open position.

The control system for the coil 112 and electromagnets 142 of the actuating means for the valve 135 comprises a starting switch (not shown) and a time delay device including a detector 151 which is mounted on one of the pole shoes 114. In contrast to operation of the control system of FIG. 2, the control system of the brake of FIG. 4 is designed to deenergize the electromagnets 142 in response to energization of the coil 112 so that the valve 135 is moved to the open position by the springs 147 as soon as the eddy currents induced in the rotor 120 begin to heat the brake. The time delay means including the detector 151 (and relay or the like, not shown) serves to energize the electromagnets 142 and to thus move the valve 135 to the closed position 135' with a certain delay following deenergization of the coil 112. An advantage of the brake of FIG. 4 is that the cooling means is capable of cooling the brake even if the control system becomes defective, for example, by failing to maintain the electromagnets 142 in energized condition. Since the valve 135 opens in response to deenergization of electromagnets 142, the blades 127 and 170 can cool the braking members 111, 120 whenever the brake is used because the valve 135 opens in response to expansion of the springs 147.

It is further within the purview of the invention to move the valve 35 or 135 by actuating means employing hydraulic or pneumatic cylinder and piston units which replace the electromagnets 42, 142 or the thermostatic devices 55. Such cylinder and piston units are preferably associated with suitable electromagnetic valves which regulate the flow of a hydraulic or gaseous medium into and from the cylinders of the respective units in such a way that the units move the valve 35 or 135 to open position in response to energization of the coil in the stator and that the units return the valve 35 or 135 to closed position with a predetermined or temperature-dependent delay following deenergization of the coil.

Moreover, the time delay means employing the NTC-resistor 41 or 151 can be replaced with other time delay means, for example, one or more timelag relays which automatically open the circuit of the electromagnets or electromagnetic valves in the actuating means with a predetermined but preferably variable delay following deenergization of the coil. A single timelag relay can replace the time delay means 51, 52 of FIG. 2 or the corresponding time delay means of the control system in the brake of FIG. 4. An advantage of a relay is that it contributes to simplicity and reliability of the control system. On the other hand, time delay means with temperature-responsive detectors are capable of terminating the cooling action when the parts of the brake are cooled to a desired temperature.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

I claim:

1. An eddy current brake, particularly for use in automotive vehicles, comprising a rotary braking member; a coaxial second braking member, one of said members having coil means energizable to induce in the other member eddy currents with attendant application of a braking force to said rotary member and heating of said braking members; cooling means comprising coolant circulating means provided on said rotary member to circulate a coolant along at least one of said members and valve means openable to admit a fluid coolant into the range of said circulating means; actuating means operable to open said valve means; and control means for said coil means and for said actuating means, comprising starting means movable between an operative position in which said coil means is energized and said actuating means is operated to maintain said valve means in open position and an inoperative position in which said coil means is deenergized, and time delay means for terminating the operation of said actuating means to effect closing of said valve means with a delay following deenergization of said coil means.

2. A brake as defined in claim 1, wherein said time delay means comprises detector means for measuring the temperature of at least one of said braking members and for producing a signal in response to detection of a predetermined temperature, and a device for terminating the operation of said actuating means in response to said signal.

3. A brake as defined in claim 2, wherein said detector means comprises an NTC-resistor and said device comprises electric signal amplifier means.

4. A brake as defined in claim 3, wherein said resistor is provided on said second braking member and wherein said second braking member is a stator.

5. A brake as defined in claim 1, wherein said time delay means is arranged to terminate the operation of said actuating means with a predetermined delay following the movement of said starting means to said inoperative position.

6. A brake as defined in claim 1, wherein said actuating means comprises at least one electromagnet having a first condition of energization in which said valve means is open and a second condition of energization in which said valve means is closed, said starting means being arranged to place said electromagnet into said first condition in response to energization of said coil means and said time delay means being arranged to place said electromagnet into said second condition with said delay following deenergization of said coil means.

7. A brake as defined in claim 1, wherein said actuating means comprises at least one hydraulic cylinder and piston unit and electromagnetic valve means controlled by said starting means and said time delay means for regulating the flow of a hydraulic fluid to and from said unit.

8. A brake as defined in claim 1, wherein said actuating means comprises at least one pneumatic cylinder and piston unit and electromagnetic valve means controlled by said starting means and said time delay means for regulating the flow of a gaseous fluid to and from said unit.

9. A brake as defined in claim 1, wherein said actuating means comprises at least one heat-expansible element which is arranged to open said valve means in response to expansion thereof and heating means controlled by said starting means and said time-delay means for heating said element during an interval starting with energization of said coil means and ending upon completion of said delay.

10. A brake as defined in claim 9, wherein said heating means comprises an electric resistance heater which is convoluted around said element.

11. A brake as defined in claim 9, wherein said element consists of a material characterized by rapid expansion in response to heating.

12. A brake as defined in claim 1, further comprising means for producing a detectable signal in response to operation of said actuating means.

13. A brake as defined in claim 1, wherein said second braking member is a stator and said coil means and said actuating means are mounted in said stator.

14. A brake as defined in claim 1, wherein said rotary member is provided with at least one coolant-receiving chamber and with inlet means for admitting atmospheric air into said chamber, said valve means being arranged to seal said inlet from said chamber in the closed position thereof and said circulating means comprising blade means provided on said rotary member and arranged to induce the flow of air into said chamber by way of said inlet and from said chamber along at least one of said members in the open position of said valve means.

* * * * *